United States Patent [19]

Beattie

[11] 4,070,168
[45] Jan. 24, 1978

[54] INLET ASSEMBLY FOR AN OIL SEPARATOR

[75] Inventor: David Lloyd George Beattie, Edmonton, Canada

[73] Assignee: Porta-Test Manufacturing Ltd., Edmonton, Canada

[21] Appl. No.: 747,036

[22] Filed: Dec. 2, 1976

[51] Int. Cl.[2] ............... B01D 53/22; B01D 53/24; B01D 53/26; B01D 53/28

[52] U.S. Cl. ............... 55/205; 55/401; 55/406; 55/449; 55/451; 55/454; 55/457; 55/460; 209/144; 209/211; 210/304; 210/512 R

[58] Field of Search ............... 210/512 R, 304; 209/144, 211; 55/406, 401, 400, 447, 451, 452, 453, 454, 456, 457, 459 B, 460, 205, 204

[56] References Cited

U.S. PATENT DOCUMENTS

| 1,600,762 | 9/1926 | Hawley | 55/460 |
|---|---|---|---|
| 1,953,948 | 4/1934 | Bieth | 55/459 R |
| 2,610,697 | 9/1952 | Lovelady et al. | 210/512 R |
| 2,888,096 | 5/1959 | Evans | 55/459 R |
| 2,931,503 | 4/1960 | Clark | 209/211 |
| 3,853,512 | 12/1974 | Hayashi | 55/459 R |

Primary Examiner—Frank W. Lutter
Assistant Examiner—Frank Sever
Attorney, Agent, or Firm—E. P. Johnson

[57] ABSTRACT

The inlet assembly is mounted within a separator vessel and comprises a housing similar in shape to that of a snail shell. This housing has a generally spiral side wall closed in by top and bottom end walls. A feed pipe delivers pressurized crude oil tangentially to the inner end of the spiral side wall so that it rotates outwardly, following the length of said wall, to an outlet communicating with the interior of the separator vessel. Gas is separated by centrifugation in the smaller radius central portion of the housing and then the liquid flow velocity is reduced by expansion of the stream in the larger radius outer portion. Improvements in gas separation and emulsion reduction have been observed from use of the assembly.

2 Claims, 4 Drawing Figures

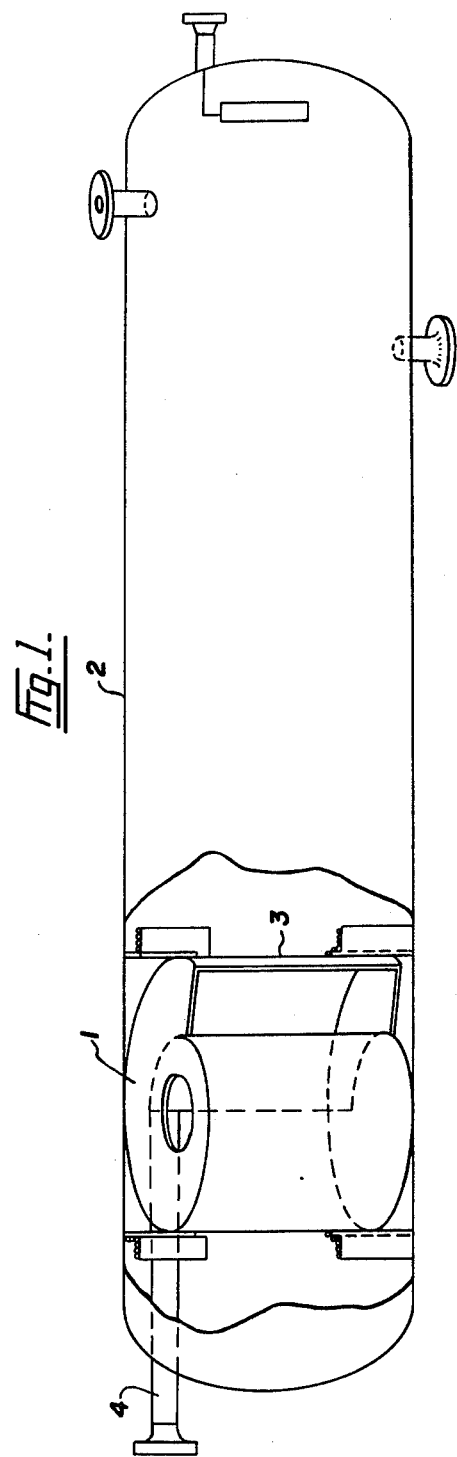
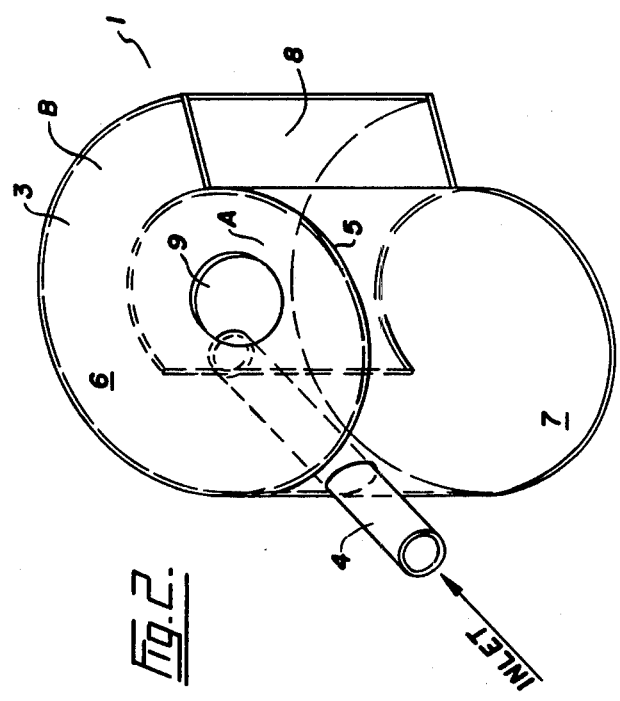

— · — NORMAL LIQUID LEVEL IN VESSEL
→ PATH OF OIL IN INLET SYSTEM
→ PATH OF GAS IN INLET SYSTEM

INLET ASSEMBLY FOR AN OIL SEPARATOR

BACKGROUND OF THE INVENTION

This invention relates to a separator for separating gas from liquid, such as crude oil.

In conventional oilfield separation, a pressurized stream of crude oil, containing gas and, in most cases, water, is admitted from a relatively small diameter pipeline into a horizontal, cylindrical vessel of relatively large diameter. As the crude oil moves into the vessel, gas breaks out of the oil and is vented. The water separates by gravity and is drained from the base of the vessel, while the degassified crude oil is withdrawn through an outlet part way up the side wall of the vessel.

In many cases, the stream of crude oil enters the vessel with considerable force. For example, a stream of 9,000 barrels of crude oil per day containing 7 million cubic feet of gas and 10% water may move through a 4 inch diameter pipeline and enter a separator vessel maintained at a pressure of 200 psi and having a diameter of 48 inches and length of 12 feet, the vessel being half full of crude oil at all times. When this incoming stream enters the vessel, it roils the crude oil contained therein. Gas entrained in the incoming crude oil breaks out beneath the oil surface within the vessel, forms foam and may carry oil out the gas discharge line. In addition, the water can form a stable emulsion with the oil when the contents of the separator are agitated. Finally, gas entrained in the oil may be removed from the vessel before it has an opportunity to break out.

SUMMARY OF THE INVENTION

It is the purpose of the present invention to provide an inlet assembly for gas-liquid separator which reduces foaming, emulsion formation and gas entrainment.

The invention is based on the mechanisms of; (1) centrifuging the crude oil to separate gas from the liquid-this is done as the crude oil enters the vessel in a chamber which is isolated from the main body of liquid in the vessel; and (2) reducing the velocity of the incoming flow by expansion in the isolating chamber before it reaches the main body of liquid, to thereby reduce turbulence and emulsion formation when the flow enters the body of degassified liquid retained in the vessel.

Broadly stated, the invention is an improvement is a separator vessel for separating gas from liquid. The improvement involves an inlet assembly comprising: a structure, mounted within the vessel, having a generally spiral wall closed in by end walls, said walls combining to form a generally spiral chamber having an outlet at the other end of the spiral wall; and tubular inlet means communicating with the inner portion of the chamber for delivering liquid containing gas under pressure from a source outside the vessel, said inlet means being adapted to cause said liquid to flow lengthwise along the inner surface of the generally spiral wall; whereby gas separates from the relatively rapidly moving liquid in the inner portion of the chamber and the velocity of the degassified liquid is diminished in the outer portion of the chamber before it is discharged through the outlet.

DESCRIPTION OF THE DRAWING

In the drawing

FIG. 1 is a side view of a conventional oil separator, partly broken away to show an inlet assembly mounted therein;

FIG. 2 is a perspective view of a preferred embodiment of the inlet assembly;

DESCRIPTION OF THE PREFERRED EMBODIMENT

Figure 3:
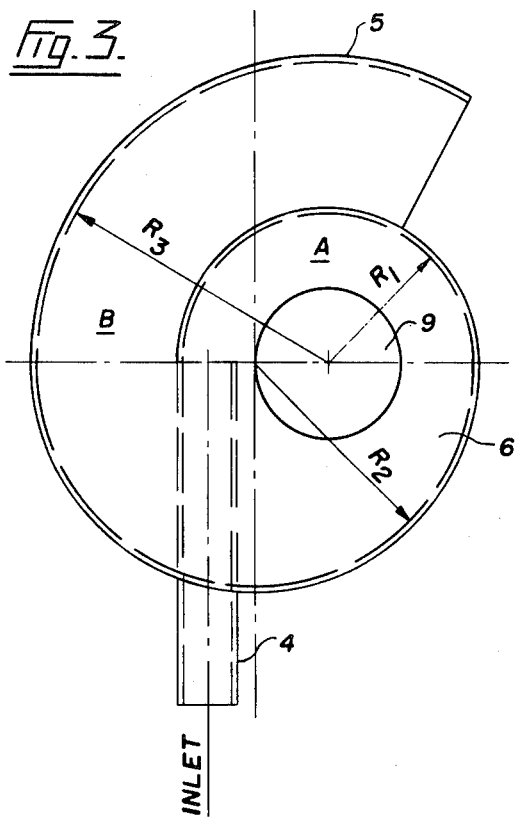
FIG. 3 is a top plan view of the inlet assembly shown in FIG. 2.

With reference now to the drawing, a novel inlet assembly 1 is shown mounted in a conventional oil separator vessel 2.

The inlet assembly 1 comprises a structure 3 and an inlet pipe 4. The structure 3 is formed by an upright generally spiral side wall 5 closed in along its sides by top and bottom end walls 6, 7. The walls combine to form a generally spiral chamber having an outlet 8, leading from the interior of the structure, at the outer end of the spiral wall 5. As illustrated, the structure 3 has a configuration somewhat like that of a snail shell.

Thus the structure 3 may be said to provide an enclosed chamber having an innermost section A of relatively small radius (termed the "centrifuging zone"), and an outermost section B of larger radius terminating at the outlet 8 (this section is termed the "velocity diminishing zone"). It will be understood that there is no demarcation between these zones A, B — one extends into the other and centrifugal separation and flow velocity reduction both occur in both zones; however centrifugal separation is greater in and the main function of the zone A while velocity reduction is greater in and the main function of the zone B.

Figure 4:
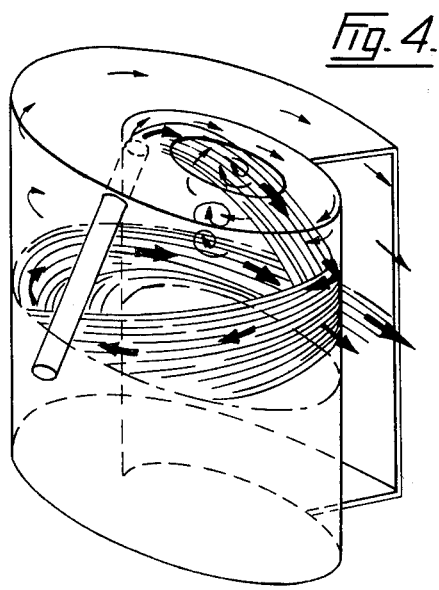
FIG. 4 is a view identical to that of FIG. 2, showing the flow paths of the liquid and gas.

The inlet pipe 4, connectable to a source of pressurized curde oil, extends into the structure 3 at its upper end. The pipe 4 is positioned tangentially relative to the inner end of the inner surface of the spiral wall 5. Thus the incoming flow is caused to rotate within the structure by following the sprial wall along its length, substantially as depicted in FIG. 4.

An opening 9 is preferably formed in the top end wall 6 at the central portion of the centrifuging zone A. This opening provides an outlet through which gas, separated in zone A, may escape.

In operation, the crude oil enters zone A, spreads out on the spiral wall, and rotates along a path of relatively small diameter, whereby severe centrifuging occurs. Gas contained in the oil breaks out and is exhausted through the opening 9. The velocity of the liquid diminishes as the stream passes through zone B, with the result that the degassified oil quietly enters the main body of liquid through the outlet 8.

I claim:

1. In a separator vessel for separating gas from liquid, an inlet assembly comprising:
    a structure, mounted within the vessel, having a generally spiral wall closed in by end walls, said walls combining to form a generally spiral outwardly divergent flow path means having an outlet at the outer end of the sprial wall and an inlet at the inner end of the spiral wall; and
    tubular inlet means communicating with the inlet of said flow path means for delivering liquid containing gas under pressure from a source outside the vessel, said inlet means causing said liquid to outwardly, divergently flow through said flow path means;

whereby gas separates from the relatively rapidly moving liquid in the inner portion of said flow path means and the velocity of the degassified liquid is diminished in the outer portion of said flow path means before it is discharged through the outlet.

2. The combination as set forth in claim 1 wherein: the spiral wall is upstanding; and an opening is provided in the central portion of the upper end wall, through which separated gas may escape from the structure.

* * * * *